Jan. 22, 1957　　　　M. H. EMRICK　　　　2,778,238
SEALED FORWARD AND REVERSE DRIVE FOR A TAPPER
Filed Nov. 9, 1953
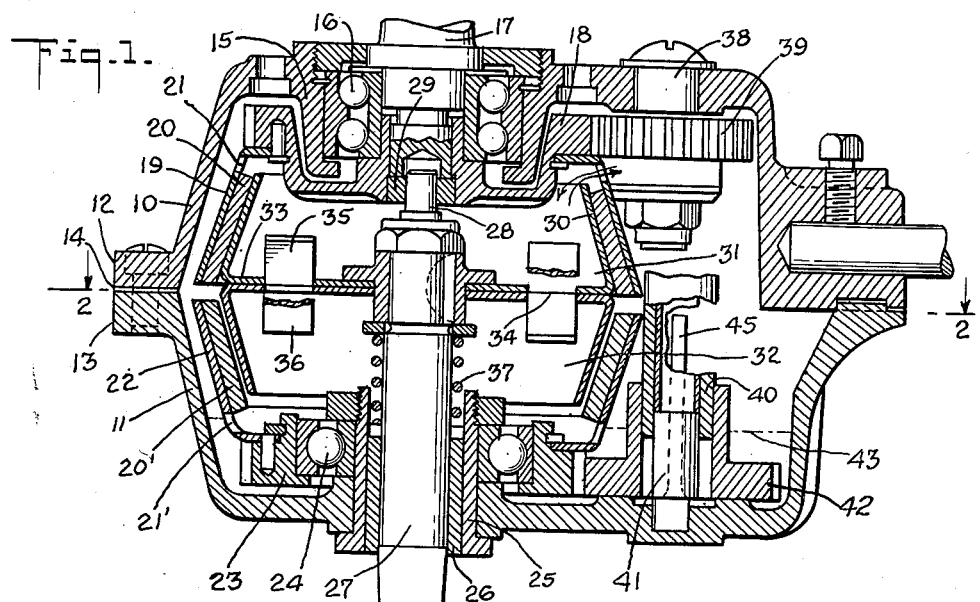
Fig. 1.
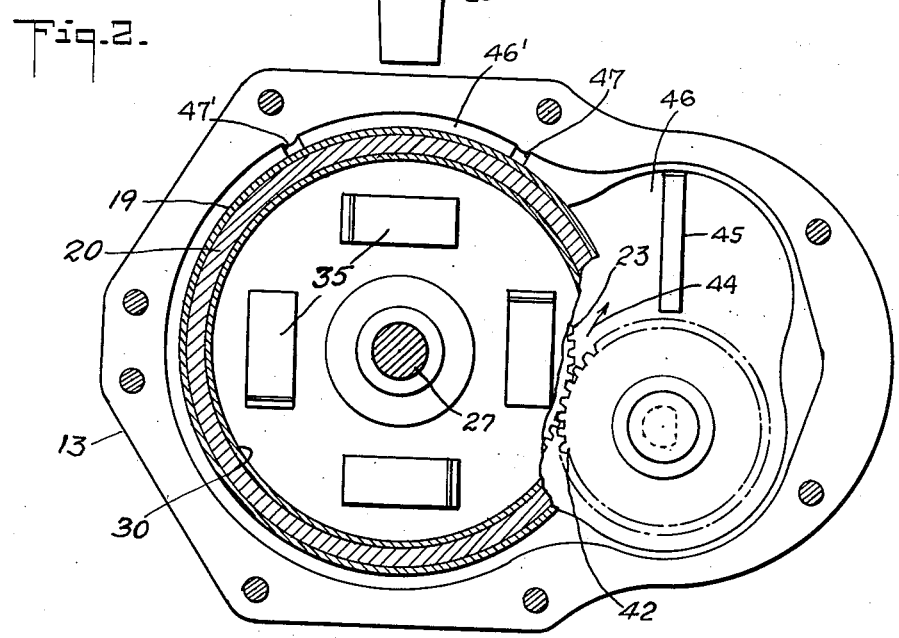
Fig. 2.
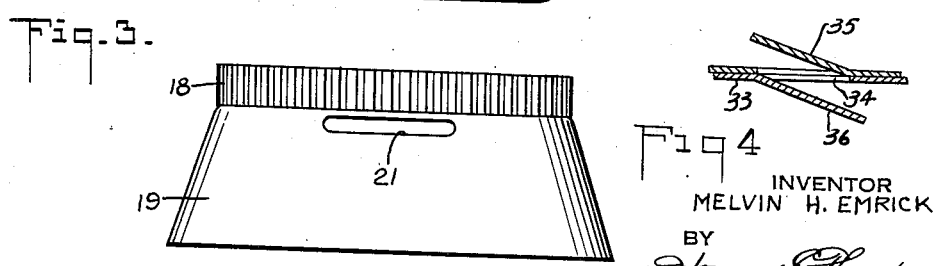
Fig. 3.
Fig. 4.
INVENTOR
MELVIN H. EMRICK
BY
Howard R. Thompson
ATTORNEY

United States Patent Office 2,778,238
Patented Jan. 22, 1957

2,778,238

SEALED FORWARD AND REVERSE DRIVE FOR A TAPPER

Melvin H. Emrick, Manhasset, N. Y.

Application November 9, 1953, Serial No. 391,051

11 Claims. (Cl. 74—377)

This invention relates to tapping devices of the type and kind employing forward and reverse friction drives to the tool shaft of the tapper. More particularly, the invention deals with a unit of this type and kind, wherein the casing is sealed and the parts operate in an oil bath which is circulated through the tapper and the casing having baffles controlling flow and circulation of oil through the tapper.

Still more particularly, the invention deals with a device of the character described having a drive cone with reversely directed blades for aiding circulation of oil through the tapper and in providing apertures in the drive shells for admission of oil into the chamber of the cone facilitating the circulation of oil.

Fig. 1 is a sectional view through a tapper made according to my invention, the section being on the broken line 1—1 of Fig. 2.

Fig. 2 is a plan view of the bottom part of the case detached with part of the construction shown in section and broken away, the section being substantially on the line 2—2 of Fig. 1.

Fig. 3 is a detailed side edge view of one of the friction cones which I employ; and Fig. 4 is a cross-sectional detail view through oppositely directed blades of sheet metal cups which are employed showing the communicating opening between the cups.

In Fig. 1 of the drawing, I have shown at 10 and 11 the upper and lower casing parts of a tapper, these parts having adjacent outwardly extended flanges 12 and 13, respectively, with a sealing strip 14 therebetween, suitable fastening devices passing through the flanges to retain the casings in coupled engagement with each other.

The casing 10 has an inwardly extending bearing portion 15, in which is mounted a ball bearing 16, in which the drive spindle 17 is mounted. Suitably fixed to the spindle 17 and partially enveloping the bearing 17 is a drive gear 18, with which a cup-shaped forward drive shell 19 is detachably coupled in manners known in the art. The shell 19 has a facing 20 adhesively secured thereto, the facing being composed of a pressed sheeting of such friction material as will operate in an oil bath of the type and kind under consideration. For example, I have found a sheeting comprising a combination of pressed cork and rubber to be suitable for this purpose. The shell 19 has, adjacent the upper end thereof, a plurality of circumferentially spaced elongated openings 21. Note in this connection, Fig. 3 in which one of these openings is shown. These openings, as well as corresponding openings on the reverse drive shell 22, provide for circulation of oil through the tapper, as later described.

The reverse drive shell 22 is of the same structure as the shell 19. In other words, it has a facing 20' similar to the facing 20 and circumferentially spaced openings 21', similar to the openings 21. The shell is detachably secured to the reverse drive gear 23 which is rotatably mounted on a bearing 24, the latter being mounted on a bearing sleeve 25 in the casing 11, in which sleeve is a plain bearing 26 for the driven tool supporting shaft 27.

The shaft 27 has a reduced upper extension 28 which operates in a plain bearing 29 in the gear 18, as clearly shown. Fixed to the shaft 27 and disposed within the two shells 19 and 22 is a conical drive head 30. The head 30 is composed of two reversely tapered sheet metal cups 31 and 32, having abutting wall portions, as at 33 which are welded or otherwise secured together. Each wall portion is cut out to form openings 34 in said walls and the cutout portions are extended upwardly and downwardly to form oppositely directed blades 35 and 36 in the cups 31 and 32, respectively. It will be apparent that a coil spring 37 is mounted on the shaft 27 and operatively engages the head 30 to normally support the head in engagement with the friction facing 20 of the shell 19 in the direct forward drive of the shaft 27. It will be apparent, however, that, in pulling upwardly on the shaft 27 to withdraw the tap, the head 30 will be moved downwardly to bring the shell 22 into frictional engagement with the facing 20', thus reversely driving the shaft 27, as well as the tool or tap coupled therewith, as with other devices of this type and kind.

At one side of the casings 10 and 11 are disposed gears for driving the reverse drive gear 23. For example, a stub shaft 38 has a pinion 39 thereon which meshes with the gear 18, the pinion 39 driving another pinion, not shown on the upper end of a tubular shaft 40 mounted on a vertical pin or rod 41, the lower end of the shaft 40 having a gear or pinion 42 which meshes with the gear 23. This particular drive is not shown in any detail, as it is well known in the art and is simply generally referred to to complete the general assemblage of the tapper and, particularly, to illustrate the functioning of the gear 42 in combination with the gear 23 in circulation of oil through the tapper.

Oil is arranged in the lower casing 11 of the tapper to a level substantially as indicated at 43 in Fig. 1 of the drawing so that the gears 23 and 42 are submerged in the oil. In the rotation of these gears, oil will be moved or circulated in a direction, as indicated, for example, by the arrow 44 in Fig. 2 of the drawing in the direction of a wide baffle 45 disposed only in the casing part 11. This circulated oil will then have a tendency to rise in the chamber 46 at one side of the baffle and will be assisted in this operation by another and shallow baffle 47 which extends along the surface of the bottom shell 22 in close proximity thereto, in other words, will be shaped to conform with the general shape of the shell 22 with sufficient clearance to avoid any contact of the shell with said baffle.

Another similar baffle 47' is arranged in spaced relation to the baffle 47 for the purpose of directing oil which may pass into the second chamber 46' upwardly so that oil may reach the upper part of the casing 10 to lubricate the operating parts in the casing and also to extend into the chamber of the upper cup 31 through the openings 21, as indicated by the arrows in Fig. 1. It will also be understood that some oil will be forced upwardly through the apertures 21' in the cup 32 and this oil will be moved up through the openings 34 and some of it will also circulate outwardly through the openings 21. In this connection, it will be apparent that, in the forward and reverse drives of the head 30, the blades 35 and 36 will act to assist in the upward and downward circulation of oil through the head, thus producing, in the cycles of operation of the tapper, that is to say, the repeated forward and reverse drives thereof, what may be termed a turbulence or splashing of oil in more or less all directions within the tapper for the complete lubrication of all of the parts. In this operation, it will be understood that oil extends to the surfaces of the head, as well as the friction facing materials 20, 20' employed. This I have found to be an advantageous feature in that the initial drive either in the forward or reverse directions sets up a momentary slippage until an effective grip takes place between the head and the friction facings and, with facing materials of the kind under consideration, a firm and positive grip sufficient for the required drive or operation of a tool is maintained; whereas, in the event of a build-up of excessive stress or strain such as striking exceedingly hard spots in a workpiece, the normal friction yielding of the tapper will be provided, thus preventing breakage or injury to the tool.

From the foregoing, it will be apparent that the baffles, as well as the head structure, materially facilitates the upward circulation of the oil to insure lubrication of all of the operating parts. I have found from experience that a sealed tapper of the kind under consideration can be guaranteed to operate efficiently for a long period of time and that wear upon the surface of the friction materials employed is materially minimized by virtue of the lubricant employed.

Tappers of the kind under consideration are usually operated at high speed and I have found from experience that, by circulating oil in the manner disclosed, a tapper can be actuated at these high speeds without danger of any overheating.

In producing the shells 19, 22, the facing friction material 20, 20' is cut from a sheet in an arc-shaped manner and, then, is set into the shell after having applied a coating of a suitable adhesive to the inner surface of the shell and the outer surface of the friction facing and the parts are firmly united and assembled by applying heat and pressure to firmly force the facing into engagement with the wall of the shell fusing the adhesive material employed to establish a secure bond. This operation can be accomplished through the medium of an induction heating unit in accordance with teachings in a companion application, Serial Number 391,052, filed November 9, 1953, later issued in Patent Number 2,749,262, dated June 5, 1956.

Having fully described my invention, what I claim as new and desire to secure by Letters Patent is:

1. A tapping device of the character described, comprising a two part casing defined by upper and lower casing parts, forward and reverse drive shells rotatably mounted in the casing, a drive shaft directly coupled with the forward drive shell, a gearing including part of the forward drive shell for actuating said reverse drive shell, a driven shaft rotatably mounted in the casing and having a double conical head disposed within and operatively engaging said shells in the forward and reverse drive of said driven shaft, the cones of said head extending upwardly and downwardly forming upper and lower chambers in said head, said shells having friction facings secured thereto, abutting walls of said conical heads having apertures placing said upper and lower chambers in communication with each other, and said shells having elongated apertures placing the casing externally of the shells in communication with the chambers of said head.

2. A tapping device of the character described, comprising a two part casing defined by upper and lower casing parts, forward and reverse drive shells rotatably mounted in the casing, a drive shaft directly coupled with the forward drive shell, a gearing including part of the forward drive shell for actuating said reverse drive shell, a driven shaft rotatably mounted in the casing and having a double conical head disposed within and operatively engaging said shells in the forward and reverse drive of said driven shaft, the cones of said head extending upwardly and downwardly forming upper and lower chambers in said head, said shells having friction facings secured thereto, abutting walls of said conical heads having apertures placing said upper and lower chambers in communication with each other, said shells having elongated apertures placing the casing externally of the shells in communication with the chambers of said head, each chamber of the head having circumferentially spaced blades, and the upper blades of one chamber being directly oppositely to those of the other chamber.

3. A tapping device of the character described, comprising a two part casing defined by upper and lower casing parts, forward and reverse drive shells rotatably mounted in the casing, a drive shaft directly coupled with the forward drive shell, a gearing including part of the forward drive shell for actuating said reverse drive shell, a driven shaft rotatably mounted in the casing and having a double conical head disposed within and operatively engaging said shells in the forward and reverse drive of said driven shaft, the cones of said head extending upwardly and downwardly forming upper and lower chambers in said head, said shells having friction facings secured thereto, abutting walls of said conical heads having apertures placing said upper and lower chambers in communication with each other, said shells having elongated apertures placing the casing externally of the shells in communication with the chambers of said head, each chamber of the head having circumferentially spaced blades, the upper blades of one chamber being directed oppositely to those of the other chamber, said drive shaft, forward drive shell and the gear fixed thereto forming a drive unit, and said driven shaft having a bearing support in said unit.

4. A tapping device of the character described, comprising a two part casing defined by upper and lower casing parts, forward and reverse drive shells rotatably mounted in the casing, a drive shaft directly coupled with the forward drive shell, a gearing including part of the forward drive shell for actuating said reverse drive shell, a driven shaft rotatably mounted in the casing and having a double conical head disposed within and operatively engaging said shells in the forward and reverse drive of said driven shaft, the cones of said head extending upwardly and downwardly forming upper and lower chambers in said head, said shells having friction facings secured thereto, abutting walls of said conical heads having apertures placing said upper and lower chambers in communication with each other, said shells having elongated apertures placing the casing externally of the shells in communication with the chambers of said head, each chamber of the head having circumferentially spaced blades, the upper blades of one chamber being directed oppositely to those of the other chamber, said drive shaft, forward drive shell and the gear fixed thereto forming a drive unit, said driven shaft having a bearing support in said unit, means for sealing said casing parts, and the lower casing part having baffle means for controlling flow of lubricant through the casing from a storage in the lower casing part.

5. A tapping device of the character described, comprising a sealed casing having a drive shaft and a driven shaft, forward and reverse drive shells in said casing, said forward drive shell being coupled with a forward drive gear secured to said drive shaft, means placing the reverse drive shell in operative engagement with said forward drive gear, a hollow double faced conical head fixed to the driven shaft and actuated by said shells in the forward and reverse drive of said driven shaft, the lower portion of the sealed casing forming a storage chamber for a predetermined level of oil, means providing oil circulating passages through said shells and said head, and baffle means in the casing for directing oil from the bottom of the casing upwardly to the upper portion thereof for lubricating the parts and to circulate lubricant through said head.

6. A tapping device of the character described, comprising a sealed casing having a drive shaft and a driven shaft, forward and reverse drive shells in said casing, said forward drive shell being coupled with a forward drive gear secured to said drive shaft, means placing the reverse drive shell in operative engagement with said forward drive gear, a hollow double faced conical head fixed to the driven shaft and actuated by said shells in the forward and reverse drive of said driven shaft, the lower portion of the sealed casing forming a storage chamber for a predetermined level of oil, means providing oil circulating passages through said shells and said head, baffle means in the casing for directing oil from the bottom of the casing upwardly to the upper portion thereof for lubricating the parts and to circulate lubricant through said head, the drive means of said reverse drive shell including a gear fixed to the shell and a gear meshing with said last named gear, both of said last named gears being submerged in the oil stored in said casing, and said gears controlling part of oil flow in the direction of the baffle means of said casing.

7. A tapping device of the character described, comprising a sealed casing having a drive shaft and a driven shaft, forward and reverse drive shells in said casing, said forward drive shell being coupled with a forward drive gear secured to said drive shaft, means placing the reverse drive shell in operative engagement with said forward drive gear, a hollow double faced conical head fixed to the driven shaft and actuated by said shells in the forward and reverse drive of said driven shaft, the lower portion of the sealed casing forming a storage chamber for a predetermined level of oil, means providing oil circulating passages through said shells and said head, baffle means in the casing for directing oil from the bottom of the casing upwardly to the upper portion thereof for lubricating the parts and to circulate lubricant through said head, the drive means of said reverse drive shell including a gear fixed to the shell and a gear meshing with said last named gear, both of said last named gears being submerged in the oil stored in said casing, said gears controlling part of oil flow in the direction of the baffle means of said casing, and the baffle means of said casing comprising baffles spaced with respect to each other and to the reverse drive shell of the device.

8. A tapping device of the character described, comprising a sealed casing having a drive shaft and a driven shaft, forward and reverse drive shells in said casing, said forward drive shell being coupled with a forward drive gear secured to said drive shaft, means placing the reverse drive shell in operative engagement with said forward drive gear, a hollow double faced conical head fixed to the driven shaft and actuated by said shells in the forward and reverse drive of said driven shaft, the lower portion of the sealed casing forming a storage chamber for a predetermined level of oil, means providing oil circulating passages through said shells and said head, baffle means in the casing for directing oil from the bottom of the casing upwardly to the upper portion thereof for lubricating the parts and to circulate lubricant through said head, and said shells having friction facings composed of such material as to operate under the influence of a lubricant.

9. A tapping device of the character described, comprising a sealed casing having a drive shaft and a driven shaft, forward and reverse drive shells in said casing, said forward drive shell being coupled with a forward drive gear secured to said drive shaft, means placing the reverse drive shell in operative engagement with said forward drive gear, a hollow double faced conical head fixed to the driven shaft and actuated by said shells in the forward and reverse drive of said driven shaft, the lower portion of the sealed casing forming a storage chamber for a predetermined level of oil, means providing oil circulating passages through said shells and said head, baffle means in the casing for directing oil from the bottom of the casing upwardly to the upper portion thereof for lubricating the parts and to circulate lubricant through said head, said shells having friction facings composed of such material as to operate under the influence of a lubricant, and said friction facings being adhesively secured to said shells.

10. A tapper of the character described, comprising a sealed casing, a drive shaft extending into said casing, a driven shaft protruding therefrom, means comprising forwardly and reversely driven friction elements in operative engagement with the drive shaft for actuating the driven shaft in forward and reverse directions, said elements having facings of friction material of such characteristics as to operate efficiently when subjected to lubricating oil, the lower portion of the casing being adapted to store lubricating oil at a predetermined level, and means controlling circulation of oil through the entire casing in lubrication of all of the operative parts of the tapper.

11. A tapper of the character described, comprising a sealed casing, a drive shaft extending into said casing, a driven shaft protruding therefrom, means comprising forwardly and reversely driven friction elements in operative engagement with the drive shaft for actuating the driven shaft in forward and reverse directions, said elements having facings of friction material of such characteristics as to operate efficiently when subjected to lubricating oil, the lower portion of the casing being adapted to store lubricating oil at a predetermined level, means controlling circulation of oil through the entire casing in lubrication of all of the operative parts of the tapper, the drive from said elements to the driven shaft including a hollow drive head, and said head and elements having means controlling and directing circulation of lubricant through said elements and head.

References Cited in the file of this patent

UNITED STATES PATENTS

| Number | Name | Date |
|---|---|---|
| 1,665,076 | Tessky | Apr. 3, 1928 |
| 1,988,967 | Emrick | Jan. 22, 1935 |
| 2,106,870 | Floss | Feb. 1, 1938 |
| 2,164,294 | Mahan | June 27, 1939 |
| 2,380,387 | Allen | July 31, 1945 |
| 2,540,099 | Christian | Feb. 6, 1951 |